G. H. CHENEY.
PAN COUNTERWEIGHT.
APPLICATION FILED MAR. 31, 1917.

1,269,051.

Patented June 11, 1918.

Inventor
George H. Cheney
By Herbert E. Smith
Attorney

UNITED STATES PATENT OFFICE.

GEORGE H. CHENEY, OF SPOKANE, WASHINGTON.

PAN-COUNTERWEIGHT.

1,269,051.   Specification of Letters Patent.   Patented June 11, 1918.

Application filed March 31, 1917. Serial No. 158,893.

*To all whom it may concern:*

Be it known that I, GEORGE H. CHENEY, a citizen of the United States, residing at Spokane, in the county of Spokane and State of Washington, have invented certain new and useful Improvements in Pan-Counterweights, of which the following is a specification.

My invention relates to pan counterweights and the object thereof is the provision of a very simple comparatively inexpensive adjustable counter-weight for pots or pans especially those maintaining a long handle, as in the case of a frying pan.

The object of the invention is to provide a counter-weight which will be especially useful in maintaining a balance of the pan when the stove lid has been removed and the pan inserted in the stove hole, in which case the weight acting to counterbalance the handle, will prevent the pan from tipping or being thrown out of a level position.

Generally speaking, the device comprises a weight body and supporting means for securing it to a frying pan or a like object and adapted to maintain the weight in adjusted position thereupon so that the tipping of the pan in pouring off fluids therefrom will not cause disengagement.

The various features of the construction, combination, arrangement and details of the several features comprising a complete organization will be hereinafter fully pointed out and described, recourse being had to the accompanying drawings, in which Figure 1 is an elevation of the ordinary type of frying pan with my counter-weight applied thereto.

Figure 1:
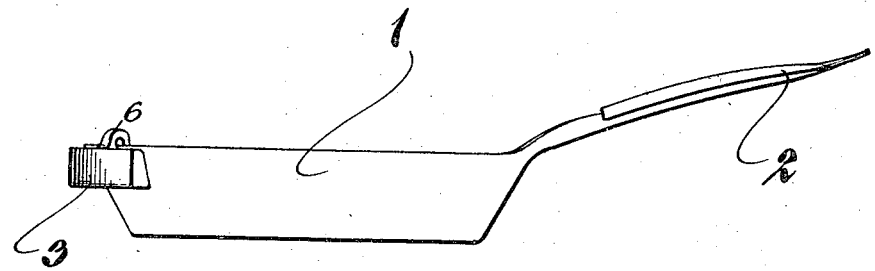
Figure 2:
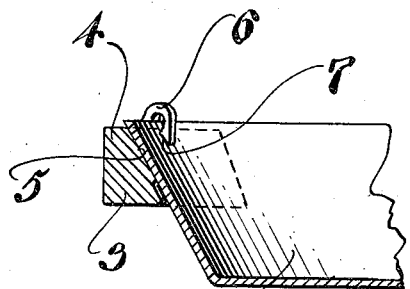
Fig. 2 is a cross section through a portion of the pan and through the counter-weight taken at a point equi-distant from the ends.
Figure 3:
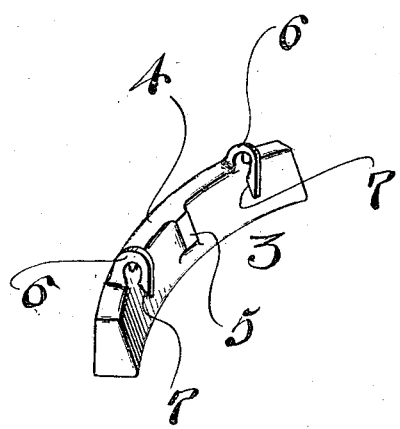
Fig. 3 is a perspective view of my counter-weight.

Referring more specifically to the drawings in which like characters of reference indicate like parts in the several views, it will be observed that the weight is constructed for application to a frying pan or the like upon the outside rim and is disposed at a point opposite to the handle. The numeral 1 represents the pan, 2 the handle and 3 the counter-weight. This counter-weight is constructed of some inexpensive cast material such as iron, and consists of a body portion 4 somewhat circular and of the same curvilinear formation as the outside of the pan and maintaining substantially the same bevel therewith. Central-most of the weight and on the inner face is provided a small boss 5 and somewhat near the ends of the weight are provided hook members 6 which engage the rim of the pan to support the weight securely thereto. The hook members 6 are provided with a somewhat angular face 7 which allows free engagement over the rim of a pan, but which will bind tightly therewith when pressed downward over the rim. In providing this engagement the boss 5 will engage the outside face of the rim and the hook members the inside face, and as the location of these several members with respect to each other is upon a curve somewhat greater than the diameter of the pan at the point of attachment, a firm means of securing the weight is provided on account of the tendency to distort the pan and a secure frictional engagement is thus maintained and disengagement will not take place under ordinary usage, but when washing the pan, removal is easily effected for purposes of providing perfect sanitation, or for disposing of the weight when it is not desired.

While I have illustrated and described a complete embodiment of my invention it is to be understood that I reserve the right to make such changes in the general organization of the device and in the specific construction, and form of the several elements, without relinquishing my patent rights so long as in so doing I remain within the spirit and scope of the invention as defined in and by the appended claims.

I claim:—

1. The combination with a frying pan or the like, of a weight supported on the rim of the pan and provided with a boss centrally located and engaging the outside face and hook members near the ends thereof and on each side of the boss and engaging the inside face of the pan and securely maintaining the weight in connection therewith.

2. The combination with a pan, of a weight supported on the outside edge thereof and provided with a securing means consisting of a boss or raised portion centrally located and engaging the pan on the outside face and of hook members on each side of said boss engaging the pan on the inside face and provided with a tapered engaging face, said securing means being disposed in alinement with the periphery of a circle of a larger diameter than that of the pan.

3. The combination with a frying pan or the like having a handle extending therefrom, of a counter-weight to maintain a balance therefor consisting of a curvilinear weight member removably secured to the outer rim of the pan and in frictional engagement therewith, said counter-weight consisting of a weight body portion, a raised boss centrally located on the inside surface of said weight and engaging the outer face of the pan, and hook members on each side of said boss and engaging the rim of the pan on the inside surface.

4. The combination with a frying pan, of a counter-weight member consisting of a weight portion formed curvilinear and of substantially the same form as the outside of the rim of the pan, said weight provided with means for securing it thereto consisting of a raised boss located centrally of the weight and engaging the outer face of the rim of the pan and of hook members located on each side of the boss and engaging the inner face, said hook members provided with tapering pan engaging faces and provided to wedge the weight securely to the pan and with increasing security as pressure is applied for such engagement.

In testimony whereof I affix my signature.

GEORGE H. CHENEY.

Copies of this patent may be obtained for five cents each, by addressing the "Commissioner of Patents, Washington, D. C."